US008549262B2

(12) United States Patent
Mejdrich et al.

(10) Patent No.: US 8,549,262 B2
(45) Date of Patent: Oct. 1, 2013

(54) INSTRUCTION OPERAND ADDRESSING USING REGISTER ADDRESS SEQUENCE DETECTION

(75) Inventors: Eric O. Mejdrich, Rochester, MN (US); Adam J. Muff, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 12/778,635

(22) Filed: May 12, 2010

(65) Prior Publication Data
US 2011/0283090 A1 Nov. 17, 2011

(51) Int. Cl.
*G06F 9/30* (2006.01)
(52) U.S. Cl.
USPC .......................................... 712/208; 712/209
(58) Field of Classification Search
USPC .......................................... 712/208, 209, 210
See application file for complete search history.

(56) References Cited

U.S. PATENT DOCUMENTS

| | | | | | |
|---|---|---|---|---|---|
| 5,655,132 | A | * | 8/1997 | Watson | 718/104 |
| 5,857,103 | A | * | 1/1999 | Grove | 717/158 |
| 5,870,597 | A | * | 2/1999 | Panwar et al. | 712/230 |
| 5,991,870 | A | * | 11/1999 | Koumura et al. | 712/208 |
| 6,385,714 | B1 | * | 5/2002 | Koumura et al. | 712/219 |
| 6,651,160 | B1 | * | 11/2003 | Hays | 712/210 |
| 7,117,342 | B2 | * | 10/2006 | Tremblay et al. | 712/208 |
| 2010/0125719 | A1 | * | 5/2010 | Hickey et al. | 712/205 |
| 2011/0047355 | A1 | * | 2/2011 | Mejdrich et al. | 712/208 |

OTHER PUBLICATIONS

Lee et al., "Branch Prediction Strategies and Branch Target Buffer Design" Computer 17.1, Jan. 1, 1984, 6-22.*

* cited by examiner

*Primary Examiner* — Andrew Caldwell
*Assistant Examiner* — Yuqing Xiao
(74) *Attorney, Agent, or Firm* — Robert R. Williams (57) ABSTRACT

A circuit arrangement and method support efficient indexing into large register files by utilizing register address sequence detection, wherein register addresses to be used by an instruction are produced by concatenating a portion of the address that is contained in the instruction with another portion that is speculatively produced by sequence detection logic. The portion of the correct full address that is not contained in the instruction is stored in a software accessible special purpose register. If the end of a particular sequence of addresses is detected by the sequence detection logic, the invention speculatively assumes that the next address in the sequence will be used. Since only a portion of the full addresses are stored in the instruction, they occupy less instruction space than the full address widths. An instruction may include at least one address portion that identifies a register address.

13 Claims, 6 Drawing Sheets

INSTRUCTION OPERAND ADDRESSING USING REGISTER ADDRESS SEQUENCE DETECTION

FIELD OF THE INVENTION

The invention is generally related to data processing, and in particular to processor architectures and execution units incorporated therein.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an opcode that identifies the type of instruction, as well as one or more operands that identify input and/or output data to be processed by the instruction. In many processor designs, for example Reduced Instruction Set Computer (RISC) and other load-store designs, data is principally manipulated within a set of general purpose registers (GPRs) (often referred to as a "register file"), with load and store instructions used to respectively retrieve input data into GPRs from memory and store result or output data from GPRs and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases.

Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by obtaining a speculative portion of the full register address from register address sequence detection logic, and concatenating this portion with a portion of the address contained in the instruction, yielding a full register address suitable for addressing data in a large register file. The portion of the register address not contained in the instruction is stored in a software accessible special purpose register. This is used as a substitute for storing full register addresses in the instruction. The disclosed invention is designed to detect if a particular sequence of register addresses occurs that is usually associated with a change to the portion of the addresses that are stored in the special purpose register. When this sequence is detected, embodiments consistent with the invention speculatively issue instructions to an execution unit assuming the full register addresses follow the next address in the sequence, instead of waiting to ensure that a move to the special purpose register has completed, which improves performance.

One major reason why instruction set architectures strive for large numbers of registers is so that loops can be "unrolled" to minimize branch misprediction performance penalties. The large numbers of registers are needed to do spills and fills of data without reusing the same register in a loop. Consider the following example where a sum of many operands is computed (for instance, the sum of many cells in a column of a spreadsheet)

| loop: | lfsx  | f1, ra, rb     | # load floating point number into f1 |
|-------|-------|----------------|--------------------------------------|
|       | addi  | rb, rb, 0x4    | # increment the pointer              |
|       | fadds | f31, f1, f31   | # add to the sum kept in f31         |
|       | blt   | loop, rb, end  | # branch back to loop if rb < end    |
|       | stfsx | f31, rc, rb    | # store the result                   |

After loop unrolling, the loop might look something like this:

| loop: | lfsu  | f1, ra, 4      | # load number into f1, add 4 to RA   |
|-------|-------|----------------|--------------------------------------|
|       | lfsu  | f2, ra, 4      | # load number into f2, add 4 to RA   |
|       | lfsu  | f3, ra, 4      | # load number into f3, add 4 to RA   |
|       | lfsu  | f4, ra, 4      | # load number into f4, add 4 to RA   |
|       |       |                | # ...                                |
|       | addi  | ra, ra, 0x10   | # increment the pointer              |
|       | fadds | f31, f1, f31   | # add to the sum kept in f31         |
|       | fadds | f31, f2, f31   | # add to the sum kept in f31         |
|       | fadds | f31, f3, f31   | # add to the sum kept in f31         |
|       | fadds | f31, f4, f31   | # add to the sum kept in f31         |
|       |       |                | # ...                                |
|       | blt   | loop, ra, end  | # branch back to loop if ra < end    |
|       | stfsu | f31, rc, 4     | # store the result                   |

Note that to minimize branch mispredict penalties loops would be unrolled further than 4 times typically, but for brevity's sake the example shown above is only unrolled four times. Notice that the unrolled target registers and source registers follow a predictable pattern (f1, f2, f3, f4) in that they are used in sequence.

The disclosed invention avoids placing the upper address bits of source and/or target register addresses directly in the instruction itself, as that would use up valuable opcode space. Instead, the upper, most significant address bits are held in a software accessible SPR (Special Purpose Register). When the hardware based address sequence detector detects that a sequence is being reused for this special subset of instructions, it speculatively assumes that a move to SPR instruction will complete that increments the upper address bits in the SPR to the next address in the sequence. In the example below, the instructions lfsu* and fadds* are new instructions with unique opcodes meant to be used by embodiments consistent with the invention. Utilizing these new instructions, the example above can be altered to be unrolled to 8 registers, as shown below:

| loop: | lfsu*  | f1, ra, 4    | # load number into f1, add 4 to RA         |
|-------|--------|--------------|--------------------------------------------|
|       | lfsu*  | f2, ra, 4    | # load number into f2, add 4 to RA         |
|       | lfsu*  | f3, ra, 4    | # load number into f3, add 4 to RA         |
|       | lfsu*  | f4, ra, 4    | # load number into f4, add 4 to RA end seq |
|       | mtspr  | UADDRta, 1   | # increment upper address bits of targ addr |
|       | lfsu*  | f1, ra, 4    | # load number into f5, add 4 to RA         |
|       | lfsu*  | f2, ra, 4    | # load number into f6, add 4 to RA         |
|       | lfsu*  | f3, ra, 4    | # load number into f7, add 4 to RA         |
|       | lfsu*  | f4, ra, 4    | # load number into f8, add 4 to RA         |
|       |        |              | # ...                                      |
|       | mtspr  | UADDRfa, 0   | # reset upper address bits of source addr  |
|       | addi   | ra, ra, 0x20 | # increment the pointer                    |
|       | fadds* | f31, f1, f31 | # add f1 to the sum kept in f31            |
|       | fadds* | f31, f2, f31 | # add f2 to the sum kept in f31            |
|       | fadds* | f31, f3, f31 | # add f3 to the sum kept in f31            |
|       | fadds* | f31, f4, f31 | # add f4 to the sum kept in f31 end seq    |
|       | mtspr  | UADDRfa, 1   | # increment upper address bits of src addr |
|       | fadds* | f31, f1, f31 | # add f5 to the sum kept in f31            |
|       | fadds* | f31, f2, f31 | # add f6 to the sum kept in f31            |
|       | fadds* | f31, f3, f31 | # add f7 to the sum kept in f31            |
|       | fadds* | f31, f4, f31 | # add f8 to the sum kept in f31            |
|       |        |              | # ...                                      |
|       | mtspr  | UADDRfa, 0   | # reset upper address bits of source addr  |
|       | blt    | loop, ra, end | # branch back to loop if ra < end         |
|       | stfsu  | f31, rc, 4   | # store the result                         |

Therefore, consistent with one aspect of the invention, a computer system includes a register file for storing and retrieving operands addressed by register addresses, an execution unit for executing instructions that receive source operands from the register file and write results back into the register file, address sequence detection logic that produces speculative full register addresses to be used by the register file, software accessible special purpose register file storage used to store a portion of the register file addresses, and instruction decode logic that decodes instructions and provides the register address portion to the address sequence detection logic.

The address sequence detection logic is configured to detect if a particular sequence of register addresses has occurred, and if the end of the particular sequence has been reached, it will allow speculative issuance of the next instruction with a full register address that corresponds to the next address in the sequence. The address sequence detection logic is further configured to cancel completion of the speculatively issued instruction (flush the instruction), reissue the instruction using the correct portion of the address from the special purpose register, and reset the sequence detection logic with the correct address if it receives an indication that a move to special purpose register instruction corresponding to the next address in the sequence did not occur.

Consistent with another aspect of the invention, a method is provided for executing instructions in a processor, where, in response to receiving an instruction that corresponds to an instruction opcode that contains only a portion of the full register address in lieu of full addresses, the addresses are obtained by concatenating each individual address portion provided in the instruction with the address portion speculatively produced by register address sequence detection to yield full addresses. The speculative portion of the address is produced by detecting if the portion of the address contained in the instruction completes a particular sequence of previously used register addresses, and if it does complete a sequence, then the next full address that is produced will be the concatenation of the next portion of the address in the sequence with the portion of the address contained in the instruction. If the next instruction in the sequence does not write a matching full address into the special purpose register containing the address portion not contained in the instruction, the instruction with the speculative full address is flushed, and re-issued with the correct full address. The full source and target addresses are then provided to the register file such that operand data can be read from the register file that is associated with the source addresses. This operand data is then used to execute the instruction.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

Embodiments consistent with the invention utilize register address sequence detection to generate a speculative full register address suitable for usage by large register files. A portion of the full address is obtained from the instruction while the remainder of the full address is speculatively generated by register address sequence detection logic. The two portions are concatenated and sent to the execution unit to begin execution. Embodiments consistent with the invention also maintain a software accessible special purpose register which contains the correct value of the portion of the full address that is speculatively produced by the register address sequence detection logic. Embodiments consistent with the invention will monitor that the speculative portion of the full addresses sent to the execution unit match the content of the special purpose register. If a later instruction does not write into the special purpose register a value matching that of the speculative portion of the address, the previously issued instruction with the speculative full address is flushed and not allowed to complete execution. The instruction is then re-issued with the correct address portion from the special purpose register.

The hereinafter described embodiments allow for much greater opcode space in fixed instruction width architectures by using register address offsets that occupy fewer bits than the full source addresses, thereby freeing up more bits in the instruction for opcode space.

Other modifications will become apparent to one of ordinary skill in the art having the benefit of the instant disclosure.

Hardware and Software Environment

Figure 1:
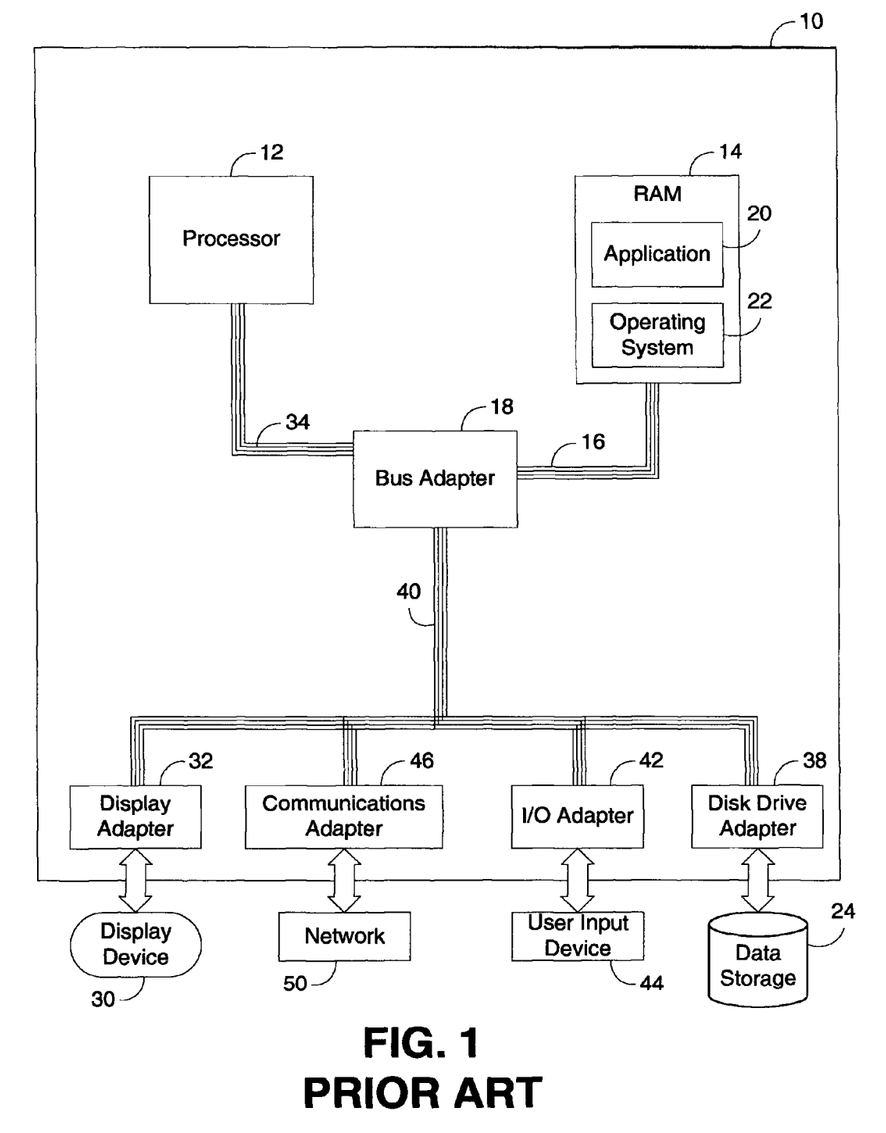
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as a random access memory 14 ('RAM'), which is connected through a high speed memory bus 16 and a bus adapter 18 to processor 12 through a processor bus 34.

Stored in RAM 14 is an application 20, a module of user-level computer program instructions for carrying out particular data processing tasks such as, for example, word processing, spreadsheets, database operations, video gaming, stock market simulations, graphics simulations, atomic quantum process simulations, or other user-level applications. Also stored in RAM 14 is an operating system 22. Operating systems useful in connection with embodiments of the invention include UNIX™ Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on data storage such as a disk drive 24.

Computer 10 of FIG. 1 includes a disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling input and output to and from user input devices 44 such as keyboards and mice. In addition, computer 10 includes a communications adapter 46 for data communications with a data communications network 50. Such data communications may be carried out serially through RS-232 connections (RS-232 was first introduced in 1962 by the Radio Sector of the Electronic Industries Association), through external buses such as a Universal Serial Bus ('USB'), through data communications networks such as IP (Internet Protocol) data communications networks, and in other ways as will occur to those of skill in the art. Communications adapter 46 implements the hardware level of data communications through which one computer sends data communications to another computer, directly or through a data communications network. Examples of communications adapter 46 suitable for use in computer 10 include but are not limited to modems for wired dial-up communications, Ethernet (IEEE (Institute of Electrical and Electronics Engineers) 802.3) adapters for wired data communications network communications, and 802.11 adapters for wireless data communications network communications. Computer 10 also includes a display adapter 32 which facilitates data communication between bus adapter 18 and a display device 30, allowing application 20 to visually present output on display device 30.

Figure 2:
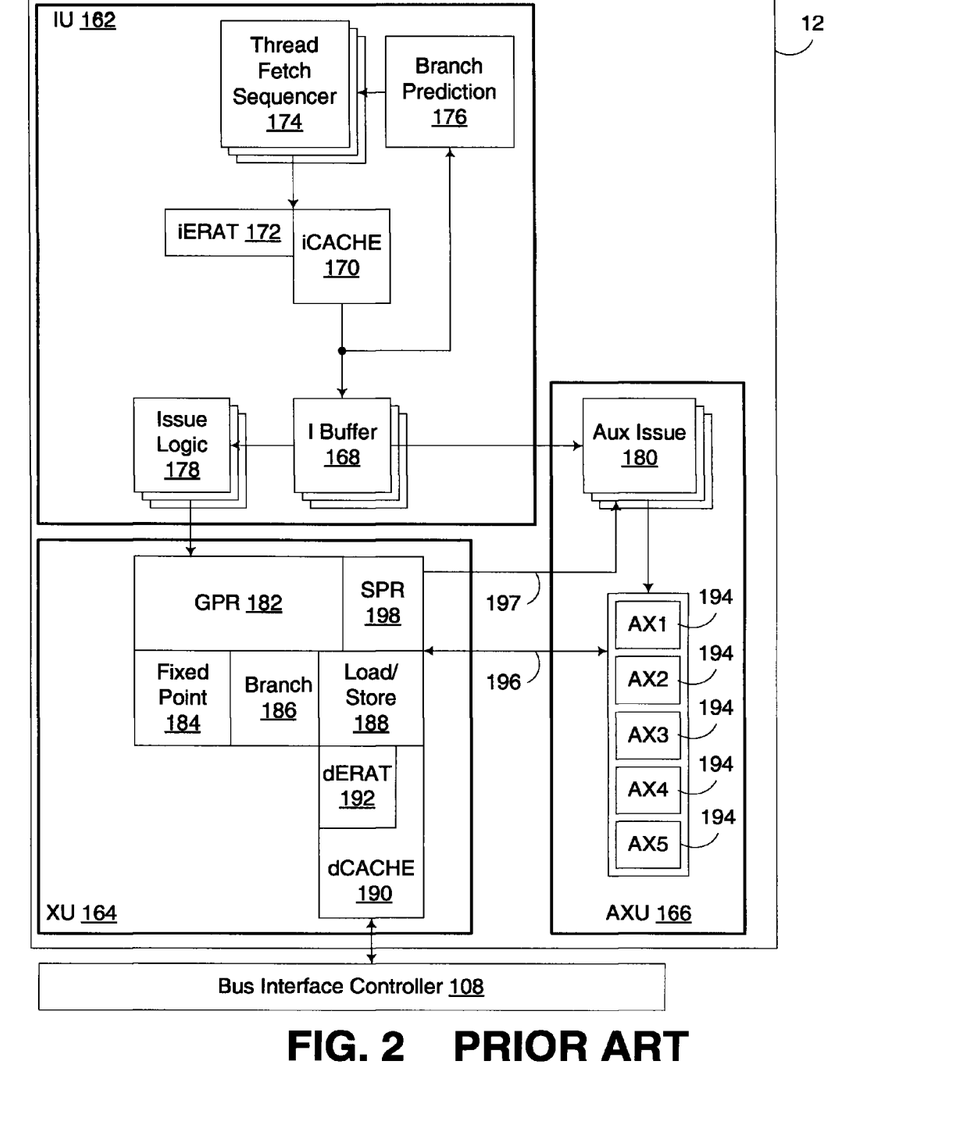
FIG. 2 is a block diagram illustrating in greater detail an exemplary implementation of the processor in FIG. 1.

FIG. 2 next illustrates in detail one exemplary implementation of a processor 12 consistent with the invention, implemented as a processing element partitioned into an instruction unit (IU) 162, an execution unit (XU) 164 and an auxiliary execution unit (AXU) 166. In the illustrated implementation, IU 162 includes a plurality of instruction buffers (I Buffer) 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory, through a bus interface controller 108. Each thread fetch sequencer 174 is dedicated to a particular hardware thread, and is used to ensure that instructions to be executed by the associated thread is fetched into the iCACHE 170 for dispatch to the appropriate execution unit. As also shown in FIG. 2, instructions fetched into instruction buffer 168 may also be monitored by branch prediction logic 176, which provides hints to each thread fetch sequencer 174 to minimize instruction cache misses resulting from branches in executing threads.

IU 162 also includes a plurality of issue logic blocks 178 and configured to resolve dependencies and control the issue of instructions from instruction buffer 168 to XU 164. In addition, in the illustrated embodiment, a plurality of separate auxiliary instruction issue logic blocks 180 is provided in AXU 166, thus enabling separate instructions to be concurrently issued by different threads to XU 164 and AXU 166. In an alternative embodiment, (not illustrated) auxiliary instruction issue logic 180 may be disposed in IU 162, or may be omitted in its entirety, such that issue logic 178 issues instructions to AXU 166.

XU 164 is implemented as a fixed point execution unit, including a general purpose register (GPR) 182 and a special purpose register (SPR) 198 both coupled to fixed point logic 184, a branch logic 186 and a load/store logic 188. Load/store logic 188 is further coupled to an L1 data cache (dCACHE) 190, with effective to real translation provided by a dERAT logic 192. XU 164 may be configured to implement practically any instruction set, e.g., all or a portion of a 32b or 64b Power™ Architecture instruction set.

AXU 166 operates as an auxiliary execution unit including the auxiliary instruction issue logic 180 along with one or more execution blocks 194. AXU 166 may include any number of execution blocks, and may implement practically any type of execution unit, e.g., a floating point unit, or one or more specialized execution units such as encryption/decryption units, generic coprocessors, cryptographic processing units, vector processing units, graphics processing units, XML (Extensible Markup Language) processing units, etc. In the illustrated embodiment, AXU 166 includes high speed auxiliary interfaces 196 and 197, to facilitate high speed communication between AXU 166 and XU 164, e.g., to support direct moves between AXU register contents and XU register contents and other high speed communication between execution units.

Register Address Sequence Detection in an Issue Unit

Figure 3:
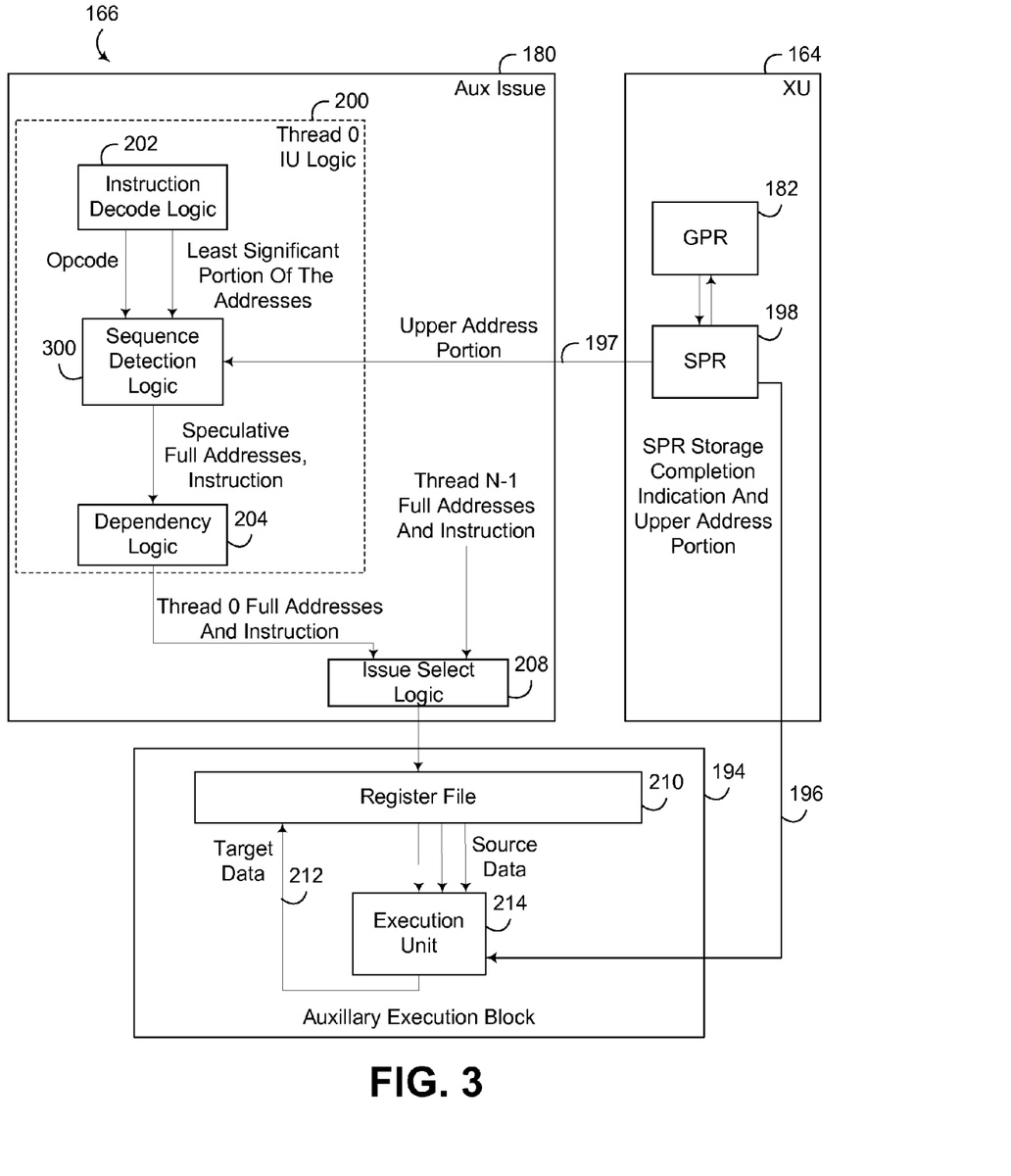
FIG. 3 is a block diagram illustrating an exemplary implementation of an auxiliary instruction issue and execution logic consistent with the invention, and capable of being implemented within the processor of FIG. 2.

FIG. 3 illustrates in further detail an exemplary AXU 166 suitable for implementation inside of processor 12 in FIG. 2. AXU 166 is configured with auxiliary instruction issue logic 180, which is configured to select fair issuance of instructions from multiple threads using an issue select logic 208, which in turn issues instructions from the selected thread to an auxiliary execution block 194. AXU 166 is also configured to decode instructions for each thread with an instruction decode logic 202. Instruction decode logic 202 decodes instructions from its associated thread to determine if the current instruction supports register address sequence detection consistent with embodiments of the invention. In addition, instruction decode logic 202 obtains one or more address portions from the instruction and provides them to sequence detection logic 300. Sequence detection logic 300 is configured to detect if a particular sequence of addresses have been used by previously decoded instructions, generate a speculative full address based on the sequence detection, and provide the speculative full addresses and the instruction to dependency logic 204. Sequence detection logic 300 is further configured to obtain the portion of the full address not contained in the instruction from SPR 198 via high speed communication bus 197, when a correct speculative address portion can not be produced. Dependency logic 204 is configured to resolve dependencies between instructions, and pass the instruction and associated full addresses to issue select logic 208.

Issue select logic 208 is configured to select fair issuance of instructions from available threads in the design, and issue instructions and full register addresses to auxiliary execution block 194. Auxiliary execution block 194 includes a register file 210 coupled to an execution unit 214. Register file 210 includes an array of registers, each of which are accessed by a unique address. For example, register file 210 may be implemented to support 64 registers, each accessed by a unique full 6 bit address. It will be appreciated that different numbers of registers may be supported in different embodiments.

Auxiliary execution block 194 is configured to obtain the full addresses from issue select logic 208, and provide them to register file 210, which in turn reads operand data associated with the full address, and provides the operand data to execution unit 214. Execution unit 214 may be implemented as a number of different types of execution units, e.g., floating point units, fixed point units, or specialized execution units such as graphics processing units, encryption/decryption units, coprocessors, XML processing units, etc, and still remain within the scope and spirit of the present invention.

Execution unit 214 performs some operation on this operand data e.g., addition, subtraction, division, etc, depending on the type of instruction issued from issue select logic 208. Execution unit 214 provides the resultant target data 212 from the operation back to register file 210, where it is stored internally at a location associated with a full address obtained from issue select logic 208. Execution unit 214 is further configured to receive an indication from SPR 198 through high speed communication bus 196 as to whether or not an instruction has been completed that has moved a value into SPR 198 that matches speculative values being used by execution unit 214. Execution unit 214 is configured to prevent completion of any instruction that is using an incorrect speculative address, such that data will be prevented from being written into an incorrect address location in register file 210.

In a multithreaded design consistent with the invention, one group 200 of instruction decode logic 202, sequence detection logic 300, and dependency logic 204 exists for each thread in the design. Alternatively, other embodiments may be implemented in a single threaded design, where only a single thread is issued to one group 200 of instruction decode logic 202, sequence detection logic 300, and dependency logic 204, and only one group 200 exists in the design.

Figure 4:
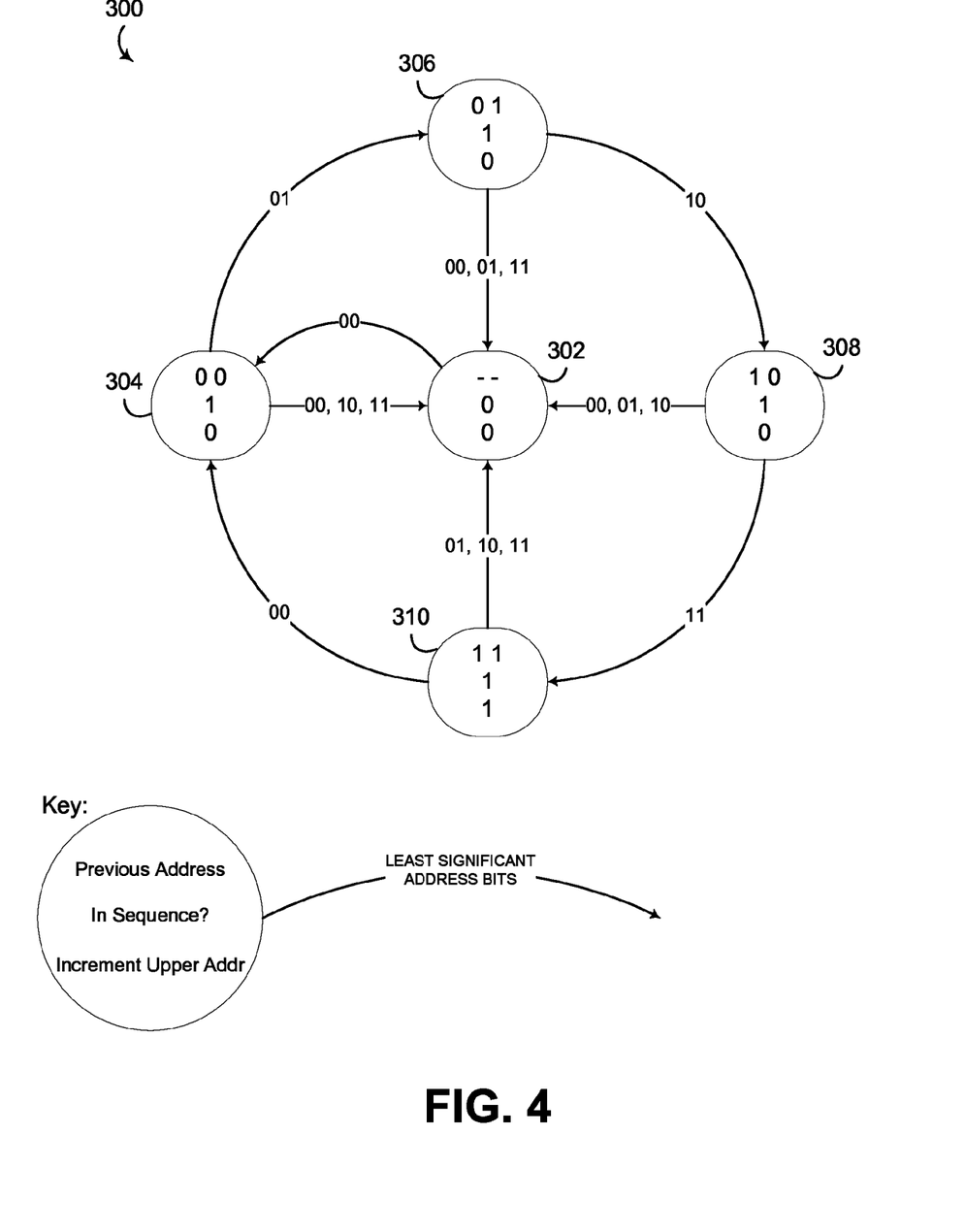
FIG. 4 is a state diagram of an address sequence detection logic consistent with the invention, and capable of being implemented within the processor of FIG. 2.

FIG. 4 illustrates in further detail the functional description of sequence detection logic 300, previously shown in FIG. 3. This particular embodiment of sequence detection logic 300 is designed to monitor the two least significant bits of the address, which are contained in the instruction, and the particular sequence to be detected is "00, 01, 10, 11". The remainder of the bits that make up the full address are speculatively produced by sequence detection logic 300, and should match the value contained in SPR 198. In the illustrated embodiment, this speculative portion is the most significant 4 bits of the full 6 bit address. The functional description of sequence detection logic 300 is illustrated as a state machine diagram, which can be used by those skilled in the associated art to fully implement the embodiment of the invention.

It should be noted that sequence detection logic 300 can be designed to detect any number of possible address sequences and any size of address subset can be used without departing from the scope of the invention.

The sequence detection logic starts out in initial state 302, where the sequence detection logic 300 has not detected the preconfigured sequence of register address, and is indicating the upper address bits of the speculative full address should not be incremented. Upon being supplied with an instruction where the two least significant digits of the address match the value "00", the state changes to state 304, where a state bit indicates that sequence detection logic is in a sequence, but that the upper address bits should not be incremented yet, and that the last address portion received was address portion value "00". In state 304, upon being supplied with an instruction where the two least significant digits of the address match any of the values "00", "10" or "11", the state changes to state 302, where a state bit indicates that sequence detection logic is not in a sequence, and that the upper address bits should not be incremented yet.

When in state 304, upon being supplied with an instruction where the two least significant digits of the address match the value "01", the state changes to state 306, where a state bit indicates that sequence detection logic is in a sequence, but that the upper address bits should not be incremented yet, and that the last address portion received was address portion value "01". While still in state 306, upon being supplied with an instruction where the two least significant digits of the address match any of the values "00", "01" or "11", the state changes to state 302, where a state bit indicates that sequence detection logic is not in a sequence, and that the upper address bits should not be incremented yet.

When in state 306, upon being supplied with an instruction where the two least significant digits of the address match the value "10", the state changes to state 308, where a state bit indicates that sequence detection logic is in a sequence, but that the upper address bits should not be incremented yet, and that the last address portion received was address portion value "10". In state 308, upon being supplied with an instruction where the two least significant digits of the address match any of the values "00", "01" or "10", the state changes to state 302, where a state bit indicates that sequence detection logic is not in a sequence, and that the upper address bits should not be incremented yet.

When in state 308, upon being supplied with an instruction where the two least significant digits of the address match the value "11", the state changes to state 310, where a state bit indicates that sequence detection logic is in a sequence, and that the upper address bits should be incremented, and that the last address portion received was address portion value "11". In state 310, upon being supplied with an instruction where the two least significant digits of the address match any of the values "01", "10" or "11", the state changes to state 302, where a state bit indicates that sequence detection logic is not in a sequence, and that the upper address bits should not be incremented yet.

When in state 310, upon being supplied with an instruction where the two least significant digits of the address match the value "00", the state changes back to state 304, as previously described.

Figure 5:
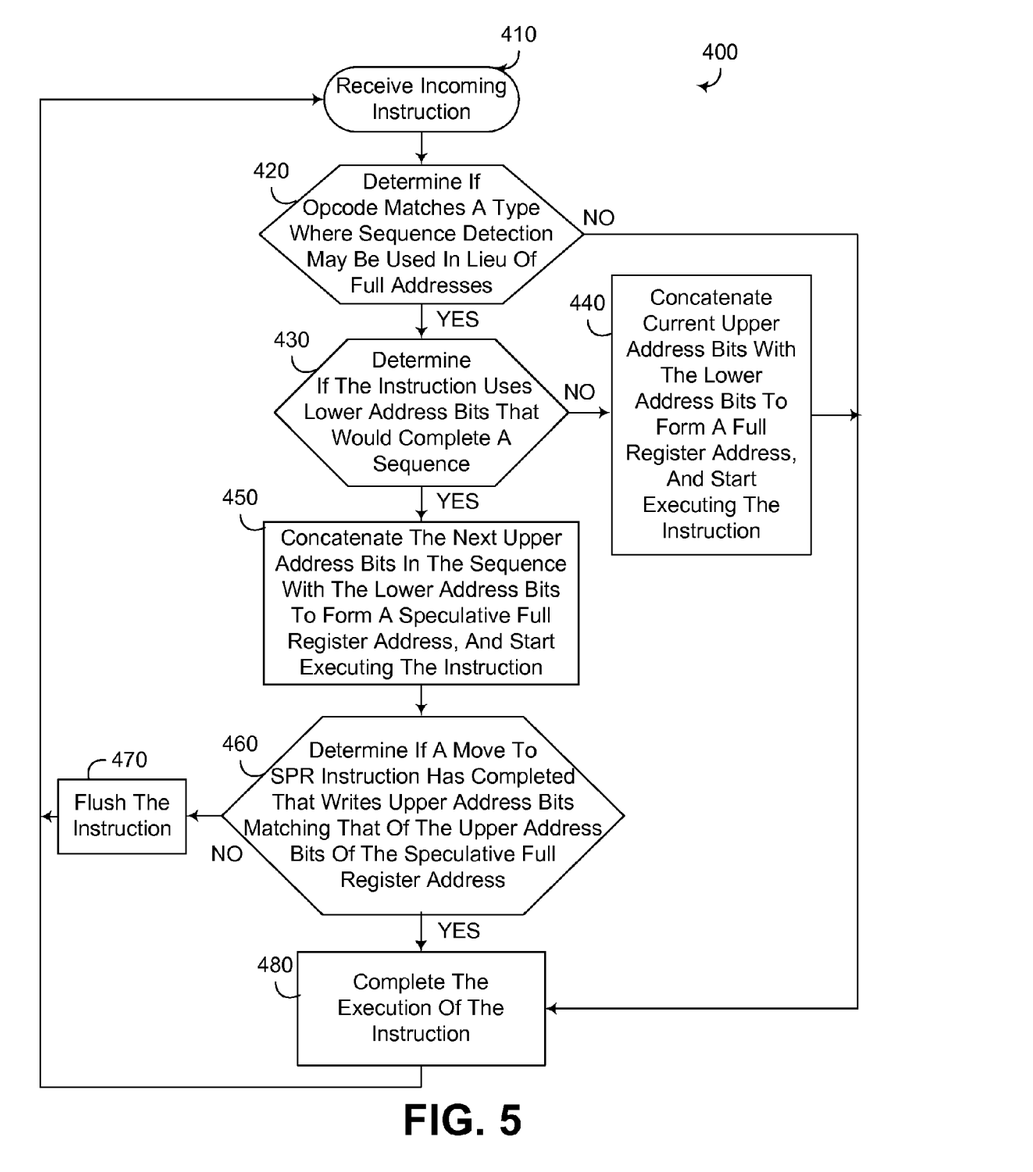
FIG. 5 is a flow chart illustrating an exemplary sequence of operations performed by the auxiliary instruction issue and execution logic of FIG. 3 to implement register address sequence detection consistent with the invention.

FIG. 5 illustrates a method 400 outlining a sequence of operations performed by auxiliary execution unit 166 when processing an instruction from an instruction stream, and supporting register address sequence detection consistent with the invention. With this sequence of operations, the instruction is received in block 410. Control then passes to block 420, where a determination is made as to whether the instruction type of the incoming instruction is of the type that contains any address portions in place of full register addresses, as supported by an execution unit supporting register address sequence detection consistent with the invention. If not, control passes to block 480, where the execution of the instruction is completed, and control passes back to block 410 to receive the next incoming instruction in the instruction stream.

If a determination is made in block 420 that the current instruction is of the type that contains address portions in lieu of full addresses intended to be used for sequence detection, then control passes to block 430, where a determination is made as to whether or not the address portion contained in the instruction completes a particular sequence. If the address portion has not completed a particular sequence of addresses, control then passes to block 440, where the current upper address bits are concatenated with the lower address bits from the instruction to yield a full register address, which is then used to read entries from the register file and start executing the instruction. Control then passes to block 480, where the execution of the instruction is completed, and control passes back to block 410 to receive the next incoming instruction in the instruction stream. If in block 430 a determination is made that the desired sequence of register addresses from previous and current instructions has been detected, control passes to block 450, where the next value in the sequence of upper address bits is concatenated with the lower address bits of the instruction, and execution of the instruction begins using that speculative full address.

Control then passes to block 460, where a determination is made as to whether or not a move to SPR instruction has completed that would write a value into the SPR that matches the speculative upper address value generated in block 450. If the speculative address and the new value of the SPR do not match, control passes to block 470 where the instruction using the speculative register address is flushed, causing control to pass back to block 410, where the next incoming instruction is received. If in block 460 a determination is made that the speculative address and the new value in the SPR do match, control passes to block 480, where execution of the instruction is completed using the speculative register address.

Figure 6:
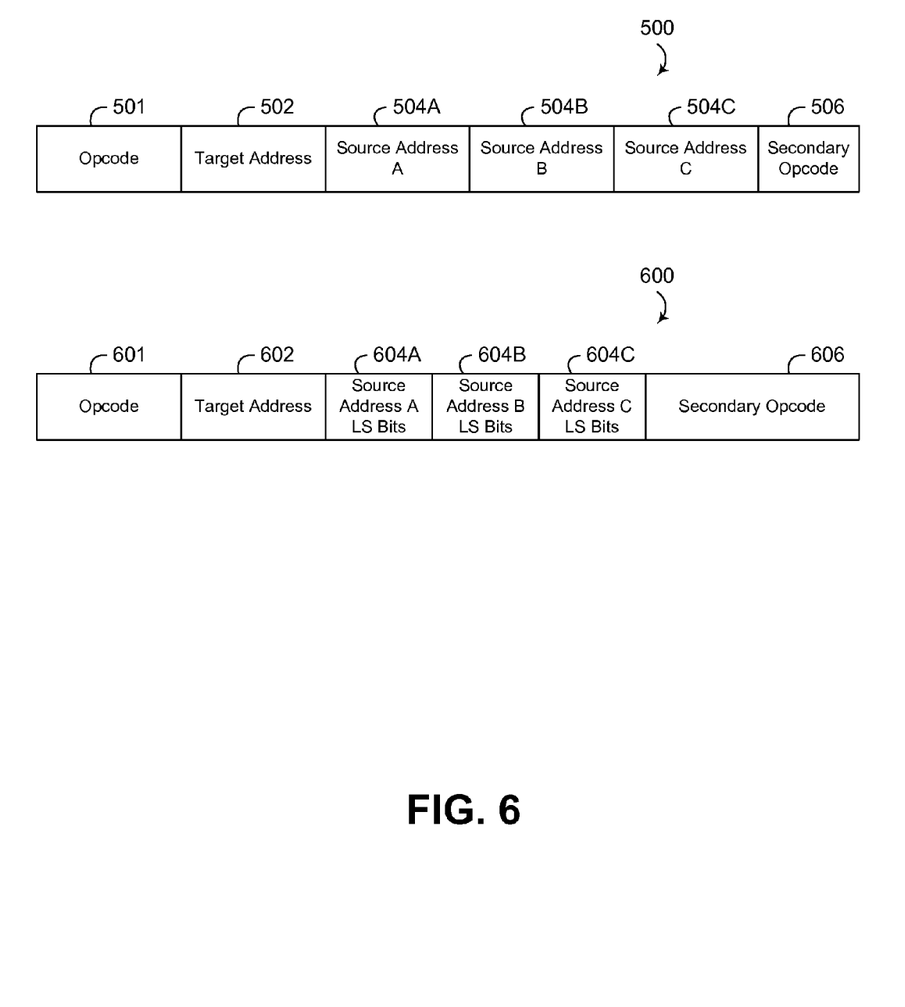
FIG. 6 is an illustration of two instruction formats, the first instruction format suitable for execution by an exemplary AXU Auxiliary Execution Unit as shown in FIG. 2, and the second suitable to be executed by an AXU Auxiliary Execution unit consistent with the embodiment shown in FIG. 3.

FIG. 6 illustrates at 500 an exemplary instruction format able to be executed by AXU 166. Instruction format 500 contains 32 bits where the bits include an instruction opcode 501 consisting of 6 bits, a 6 bit target address 502, three 6 bit source addresses 504A, 504B and 504C, and a 2 bit secondary opcode 506. As discussed previously, the 2 bit opcode 506 limits the instruction type to only 4 subtypes of operations, yet typically many more are needed.

FIG. 6 also illustrates at 600 an exemplary instruction format supporting register address sequence detection and able to be executed by AXU 166 and method 400 consistent with the invention. Instruction format 600 contains 32 bits where the bits include an instruction opcode 601 consisting of 6 bits, a 6 bit target address 602, and three source register portions 604A, 604B, and 604C consisting of 2 bits each. In addition, instruction format 600 contains secondary opcode 606 which is 14 bits. The wider secondary opcode 606 allows for a far greater number of instruction subtypes.

The 2 bit source address portions 604A, 604B and 604C may each be used to be supplied as address portions to the address sequence detection logic 300 in FIG. 4. In this manner, the source address portions from the instruction may be used to detect a sequence of source addresses.

Instruction format 600 may contain any number and combination of source address portions versus full source addresses and not depart from the scope of the invention. For instance, in place of source portion 604A a full 6 bit register address may be used, reducing the number of available bits in the secondary opcode 606 to 10 bits. Opcodes such as opcode 601 and secondary opcode 606 in the instruction specify which source operands in the instruction are referenced by register addresses directly and which are referenced indirectly via an address portion. It should be also bet noted that the fixed instruction width may be something other than 32 bits, for instance 64 bits, and not depart from the scope or spirit of the invention.

Embodiments of the present invention may be implemented within the hardware and software environment described above in FIGS. 1-6. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Other modifications will be apparent to one of ordinary skill in the art having the benefit of the instant disclosure. Therefore, the invention lies in the claims hereinafter appended.

What is claimed is:

1. A computer system, comprising:
a register file for storing and retrieving operands addressed by register addresses;
an execution unit for executing instructions, the execution unit configured to receive a source operand from the register file and write a result back into the register file;
an address sequence detection logic configured to receive and store a first least significant portion of a first register address from a first instruction, and to receive a second least significant portion of a second register address from a second instruction, and to detect whether the address sequence detection logic has received a particular sequence of least significant portions of register addresses, and to generate a speculative most significant portion of the second register address and concatenate it with the second least significant portion of the second register address to yield the full second register address, and to provide the second full register address to the register file;
the first instruction and the second instruction having unique opcodes to be used by the address sequence detection logic during sequence detection; and
an instruction decode logic configured to decode instructions and provide the first least significant portion of the first register address from the first instruction and the second least significant portion of the second register address from the second instruction to the register address sequence detection logic.

2. The computer system of claim 1, further comprising:
a special purpose register storage logic, configured to receive and store the correct most significant portion of the second register address via a third instruction identified by a special opcode.

3. The computer system of claim 2, wherein the address sequence detection logic is configured to compare the speculative most significant portion of the second register address from the second instruction with the correct most significant portion of the second register address stored in the special purpose register storage logic and if the speculative and correct register address portions do not match, cause the second instruction to be reissued with the correct most significant portion.

4. The computer system of claim 1, wherein the address sequence detection logic comprises a state machine configured to detect the particular sequence, wherein the sequence comprises $2^N$ states, where N is the width in bits of the first and second least significant register address portions.

5. The computer system of claim 4, wherein the particular sequence comprises an increasing progression of values beginning at 0 and incrementing by 1 to end with the value $2^N-1$.

6. The computer system of claim 4, wherein the particular sequence comprises a decreasing progression of values beginning at $2^N-1$ and decrementing by 1 to end with the value 0.

7. The computer system of claim 4, wherein the particular sequence comprises a binary count sequence.

8. The computer system of claim 4, wherein the address sequence detection logic comprises a storage element configured to store the determination of whether the first least significant portion of the first address from the first instruction matches the expected value in the sequence, and thus provide an indication that the state is still in sequence.

9. The computer system of claim 8, wherein the address sequence detection logic is further configured to go to the next state in the state machine if the storage element indicates that the state is still in sequence, and the second least significant address portion from the second instruction matches the immediately following next expected value in the sequence, and if so, go to the next state in the state machine.

10. A method of executing instructions from an instruction set, the method comprising the steps of:
receiving a first instruction;
determining if an opcode associated with the first instruction matches a first instruction type, the first instruction type associated with an address sequence detection logic to indicate a sequence is in progress; and
if the opcode associated with the first instruction matches the first instruction type, further determining if a least significant portion of a first address contained in the first instruction completes a particular sequence; and
if the particular sequence is detected, concatenating the least significant portion of the first address contained in the first instruction with a speculatively generated most significant portion of the first address that equals the next address portion in the sequence, yielding a full speculative register address, which is used to begin execution of the first instruction; and
if the particular sequence completion is detected, further determining if a second instruction has completed that has written a most significant portion of a second address into a software accessible special purpose register that matches the most significant portion of the full speculative register address; and
if the most significant portion of the full speculative and second addresses match, execution of the first instruction is completed using the full speculative register address.

11. The method of claim 10, the method further comprising the step of:

if the opcode associated with the first instruction does not match the first instruction type, execution of the first instruction is completed normally.

12. The method of claim 10, the method further comprising the step of:

if the least significant portion of the first address contained in the first instruction does not complete a particular sequence, concatenating the least significant portion of the first address contained in the first instruction with a most significant portion of a third address contained in the current contents of the software accessible special purpose register yielding a full non-speculative register address, which is then used to complete the first instruction.

13. The method of claim 10, the method further comprising the step of:

if the software accessible special purpose register currently contains a most significant register address portion that does not match the most significant portion of the full speculative register address, flushing the first instruction and re-issuing the first instruction using an address generated by concatenating the least significant portion of the first address contained in the first instruction with a most significant portion of a third address contained in the current contents of the software accessible special purpose register yielding a full non-speculative register address, which is then used to complete the first instruction.

* * * * *